(12) United States Patent
Cournoyer et al.

(10) Patent No.: US 6,739,861 B2
(45) Date of Patent: May 25, 2004

(54) HIGH PRESSURE CO-CURE OF LIGHTWEIGHT CORE COMPOSITE ARTICLE UTILIZING A CORE HAVING A PLURALITY OF PROTRUDING PINS

(75) Inventors: David M. Cournoyer, Seymour, CT (US); Neil W. Cawthra, Shelton, CT (US); Thomas A. Carstensen, Shelton, CT (US); Christian A. Rogg, New Milford, CT (US); Michael G. Osiecki, Oxford, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 154 days.

(21) Appl. No.: 09/995,393

(22) Filed: Nov. 26, 2001

(65) Prior Publication Data

US 2003/0098520 A1 May 29, 2003

(51) Int. Cl.⁷ .............................................. B29C 33/38
(52) U.S. Cl. ........................ 425/520; 425/389; 249/135
(58) Field of Search ................................. 425/389, 504, 425/520; 249/135; 264/313, 316, 511

(56) References Cited

U.S. PATENT DOCUMENTS

| 4,942,013 A | * | 7/1990 | Palmer et al. ............... 264/511 |
| 5,071,338 A | | 12/1991 | Dublinski et al. ........... 425/403 |
| 5,096,409 A | * | 3/1992 | Stofko ...................... 425/405.1 |
| 5,527,414 A | | 6/1996 | Dublinski et al. ........... 156/245 |
| 5,576,030 A | * | 11/1996 | Hooper ........................ 425/112 |
| 5,601,852 A | | 2/1997 | Seemann ..................... 425/112 |
| 5,702,663 A | | 12/1997 | Seemann ..................... 264/510 |
| 5,897,739 A | | 4/1999 | Forster et al. ............... 156/285 |
| 5,904,972 A | | 5/1999 | Tunis, III et al. ........... 428/178 |
| 6,159,414 A | | 12/2000 | Tunis, III et al. ........... 264/510 |
| 6,190,602 B1 | | 2/2001 | Blaney et al. ............... 264/443 |
| 2003/0011094 A1 | * | 1/2003 | Filsinger et al. ............ 264/102 |

FOREIGN PATENT DOCUMENTS

| DE | 10013409 C1 | * | 11/2000 |
| EP | 0 123 141 A | | 10/1984 |

OTHER PUBLICATIONS

X–Cor Preforms: Providing a damage resistant alternative to honeycomb, Aug. 13, 2001, http://www.aztex–z–fiber.com/products/zcorl.html.

* cited by examiner

Primary Examiner—Robert Davis
Assistant Examiner—Joseph S. Del Sole
(74) Attorney, Agent, or Firm—Carlson, Gaskey & Olds

(57) ABSTRACT

The composite molding apparatus includes a rigid base member and a complementary semi-rigid mold member or "black bag" caul plate having a sieve member formed therein. The sieve member layer of the semi-rigid mold member engages pins which extend from the sandwich core to limit penetration into the semi-rigid mold member to a predetermined depth. The semi-rigid mold member is supported relative to the rigid mold member by the pins to provide uniform pressure transfer to the composite article during a high pressure co-cure molding process without crushing the sandwich core.

25 Claims, 2 Drawing Sheets

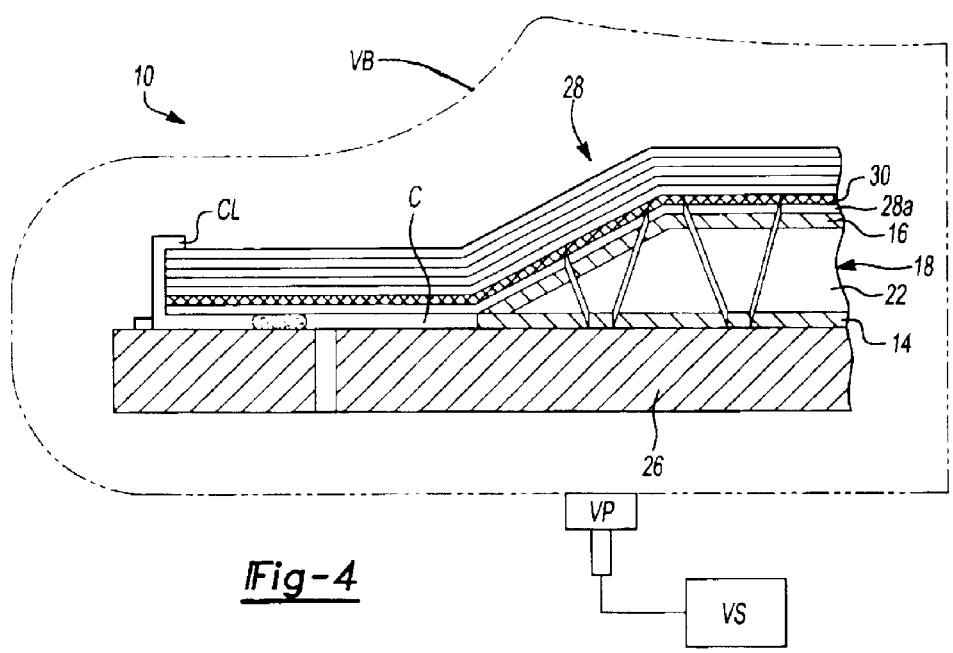
Fig-4
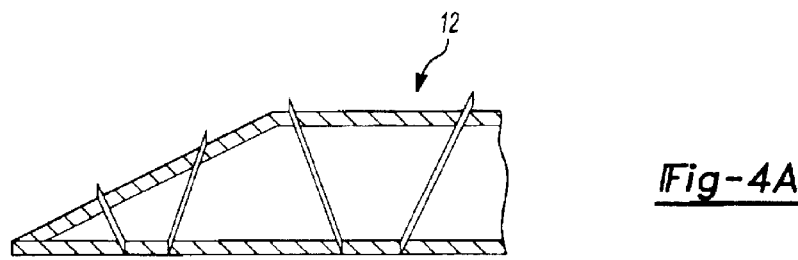
Fig-4A
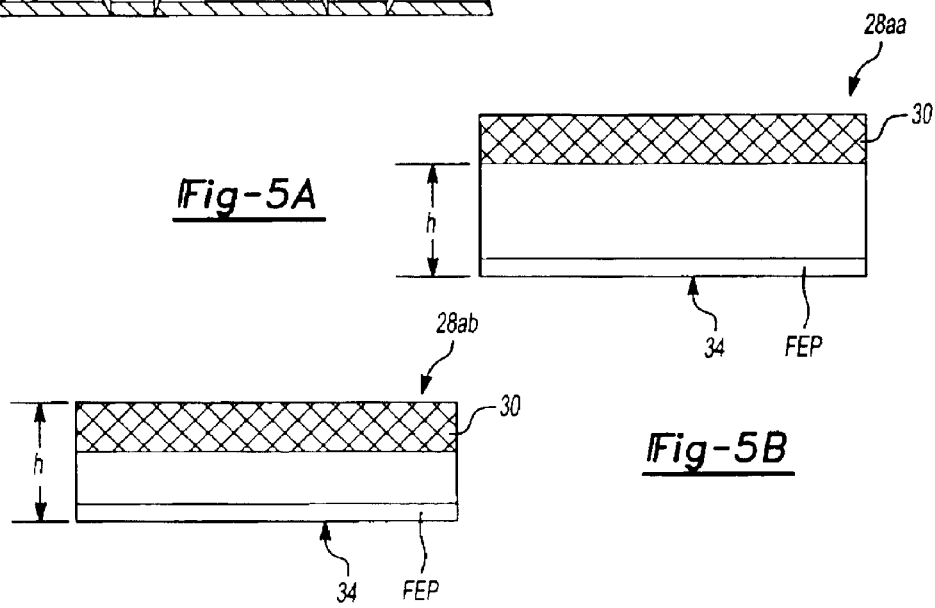
Fig-5A
Fig-5B

HIGH PRESSURE CO-CURE OF LIGHTWEIGHT CORE COMPOSITE ARTICLE UTILIZING A CORE HAVING A PLURALITY OF PROTRUDING PINS

BACKGROUND OF THE INVENTION

The present invention relates to lightweight core composite articles, and more particularly to the manufacture of such articles wherein the core thereof includes a plurality of protruding pins which pierce both upper and lower core composite face sheets.

Composite articles incorporating honeycomb (HC) cores are commonly utilized for fabricating aerospace structures due to their advantageous strength to weight ratio. Honeycomb core composite articles include upper and lower composite skins, i.e., fiber reinforced resin matrix laminates that are separated and stabilized by the HC core. The high strength and low weight of such sandwich construction results in lower overall aircraft system weight.

HC composite articles may be fabricated utilizing various conventional molding techniques. One commonly employed technique involves the use of a vacuum bag assembly wherein an impervious membrane or "vacuum bag" is employed for consolidating the composite skins and ensuring proper adhesion thereof to the centrally disposed honeycomb core. Film adhesive, which is applied to the honeycomb core prior to lay-up, forms the bonds between the upper and lower composite laminates and the honeycomb core. The vacuum bag is disposed over a rigid mold member and sealed thereto so as to form a mold cavity which is occupied by the uncured composite lay-up. The mold cavity is then evacuated and additional pressure and temperature are applied via an autoclave to cure the lay-up. The combination of vacuum and external pressure functions to consolidate the composite skins, remove air and volatiles from the resin binder, and apply the necessary compaction pressure to ensure full and uniform adhesion of the lay-up.

HC composite articles may also be fabricated utilizing fluorelastomeric tooling or "black bag" caul plate fabrication techniques. Black bag fabrication typically includes laying up the composite laminates and the HC core between a rigid mold member and a semi-rigid mold member. The semi-rigid mold member provides uniform pressure transfer to the HC core composite article during co-cure. The entire mold assembly is then vacuum-bagged and co-cured under pressure and temperature in an autoclave as described in the vacuum bag method.

Difficulties commonly encountered during the fabrication of HC composite articles relate to distortion of the HC core under compaction pressure. Such distortion is of particular difficulty for ramped HC cores. An option to minimize distortion includes applying expanding adhesive foam into the HC core to improve stabilization in the ramped area. Stabilization through filler, however, may not be practical for applications wherein the minimization of overall aircraft system weight is critical.

Another option is to limit the co-cure pressure. Generally, limiting the co-cure pressure to a maximum value of about 45 psi significantly reduces the number of incidents of core crushing in fabricating ramped HC core composite articles. Limiting the maximum co-cure pressure, however, is generally unacceptable as the HC core composite articles fabricated utilizing low co-cure pressures may embody an unacceptable level of voids which may reduce the strength of the composite article.

Recently, advanced sandwich core materials are replacing conventional HC cores to separate and stabilize composite skins. One such advanced sandwich core material is X-COR™ manufactured by Aztex, Inc. of Waltham, Mass. Although providing lighter weight, greater damage resistance, and other advantages, such core materials pose particular challenges for conventional composite articles fabrication methods.

Accordingly, it is desirable to provide a fabrication method for lightweight composite articles utilizing advanced core materials. It is further desirable to provide fabrication methods utilizing advanced core materials which are compatible with high co-cure pressures to obtain optimum fiber volume and, consequently, the strength of the composite laminate without crushing the underlying core material.

SUMMARY OF THE INVENTION

The composite molding apparatus according to the present invention provides a rigid base member and a complementary semi-rigid mold member or "black bag" caul plate having a sieve member formed therein. The semi-rigid mold member is operative to provide uniform pressure transfer during the high pressure co-cure molding process of the present invention.

The composite article manufactured by the present invention includes uncured composite skins (pre pregs) and a sandwich core such as X-COR™ manufactured by Aztex, Inc. of Waltham, Mass. The sandwich core includes pins which are inserted into a lightweight carrier such as a foam material to form a truss-like structure. The pins protrude from the carrier and include sharpened ends which assist in piercing the prepregs such that the pins form a bond/mechanical lock with the skins during the autoclave cure cycle.

The sieve member of the semi-rigid mold member such as a tight weave stainless steel screen engages the sharpened ends of the pins to limit penetration into the semi-rigid mold member to a predetermined depth during co-cure. The flexible nature of the semi-rigid mold member allows the composite skins to be consolidated down on the X-COR™ material and mechanically control the amount of compaction to the length of the pins in the core while accommodating minor variations in the core material dimensional tolerances without crushing the carrier.

The composite articles fabricated according to the present invention yield similar and higher strength results than corresponding honeycomb core panels at a lighter weight.

Composite articles according to the present invention are lighter than the equivalent strength HC core in part to due to the elimination of film adhesive commonly required to bond skins to the HC core material. Further, as the pins are engaged between the sieve member of the semi-rigid mold member and the rigid mold member, pressures greater than 45 psi may be applied to the lay-up without crushing the core. An increased fiber to resin ratio, and, consequently, the strength of the composite laminate is increased.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows:

FIG. 4 is a general view of a composite article manufactured by the method of the present invention, and more particularly, the consolidation of the lay-up illustrating pins penetration of the semi-rigid mold member of FIG. 1;

FIG. 4A is a partial cross-sectional view of a core composite article manufactured by the method of the present invention;

FIG. 5A is an exploded partial cross-sectional view of a first layer of a semi-rigid mold member according to the present invention; and FIG. 5B is an exploded partial cross-sectional view of the first layer of the semi-rigid mold member of FIG. 5A illustrating a sieve member embedded therein.

DETAILED DESCRIPTION OF THE PREFERRED EMBODIMENT

Figure 1:
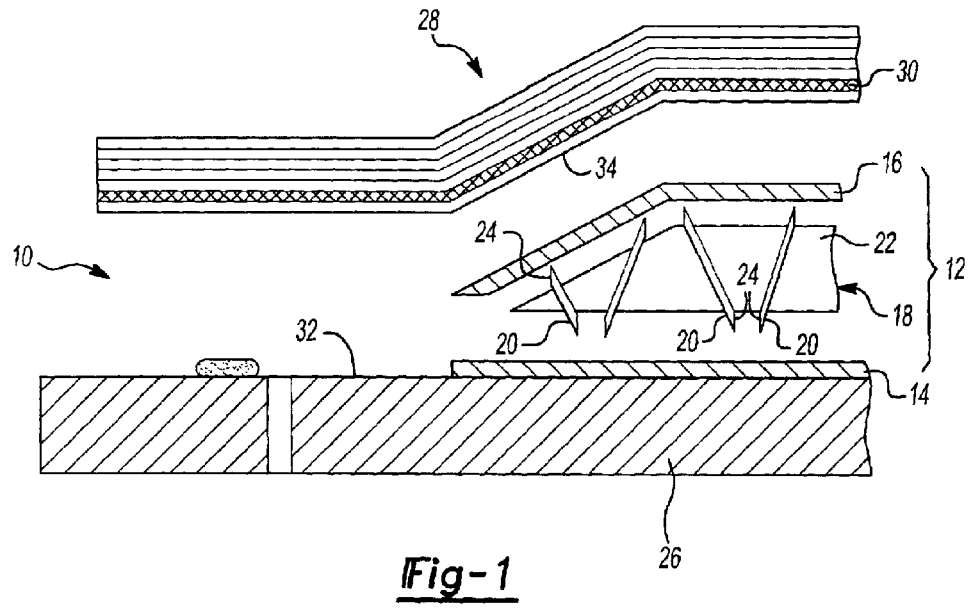
FIG. 1 is a general an exploded partial cross-sectional view of a composite lay-up employing the teachings of the present invention.

FIG. 1 illustrates a general perspective view a composite molding apparatus 10 for a high pressure co-cure molding process according to the present invention for fabricating lightweight core composite articles utilizing advanced core materials and outer composite skins. The composite article 12 includes uncured composite skins 14, 16 and a sandwich core 18. The composite skins 14, 16 are preferably formed from uncured "prepreg" or "Bstage" laminates of orientated fiber reinforcement such as graphite, aramide or fiberglass fibers disposed in a binding matrix such as epoxy, phenolic or other similar organic resinous material. The organic resin impregnated composite material is staged to form the ("tacky") composite material (prepreg). Composite prepregs in the tacky condition are handled and processed in all the operations comprising the pre-cure lay-up phase.

The core 18 is preferably an advanced core material such as X-COR™ manufactured by Aztex, Inc. of Waltham, Mass. X-COR™ can be manufactured in a multiple of forms and thicknesses which replaces conventional honeycomb core in co-cured composite sandwich panel applications. The core 18 includes pins 20 which are inserted into a lightweight carrier 22 such as a foam material to form a truss-like structure. The pins 20 are preferably, metallic or non-metallic elongated members which protrude from an external surface from the carrier 22. The pins 20 preferably include sharpened ends 24 which assist in piercing the prepreg skins 14, 16 such that the pins 20 form a bond/mechanical lock with the skins 14, 16 during the autoclave cure cycle. It should be understood that although a particular shape of pins having particular shaped end is disclosed in the illustrated embodiment, other members will benefit from the present invention. Additionally, the pattern of the pins and the number thereof may be tailored to accommodate various core strength and stiffness requirements.

As the pins 20 include sharpened ends 24 which pierce through the prepreg skins 14, 16, conventional manufacturing techniques were heretofore unavailable. The protruding X-COR™ pins pierce through the vacuum bag, rupturing it during the cure cycle, and resulting in panels with unconsolidated/void skin plies. Composite panels bagged using standard flurorelastomeric "black bag" caul plate tooling pierce deep into the semi-rigid mold member shortening the life of the tooling, and making it almost impossible to remove the bag from the cured panel. In addition to these issues, cure cycles using standard proven processes developed for honeycomb core sandwich panels with autoclave pressures in excess of 45 psi will crush the lighter forms of X-COR™ material. High pressure curing is desirable for fabricating complex, light weight composite details.

The composite molding apparatus 10 is a semi-rigid molding assembly that comprises a rigid base member 26 and a complementary semi-rigid mold member 28 or "black bag" caul having a sieve member 30 formed therein. The molding surfaces of the rigid base member 26 and the complementary semi-rigid mold member 28 in combination define the outer and inner mold line surfaces of the composite core article to be fabricated. The rigid base member 26 is preferably formed from a structurally rigid material such as aluminum, steel, or the like. The rigid base member 26 illustrated in the exemplary embodiment has a molding surface 32 that has a flat plate configuration. It should be understood, however, that the rigid base member may have a more complex molding surface configuration, depending upon the configuration of the composite article to be fabricated.

The complementary semi-rigid mold member 28 or "black bag" caul plate is a semi-rigid shaped member formed from a fiber-reinforced elastomeric material, as described herein below in further detail, that possesses a predetermined degree of flexibility so that the inner molding surfaces 34 of the semi-rigid mold member 28 conform to and define the outer and inner mold line surface of the article to be fabricated. The semi-rigid mold member 28 is operative to provide uniform pressure transfer during the high pressure co-cure molding process of the present invention.

The present invention provides a sieve member 30 layer to the semi-rigid mold member 28. Preferably, the sieve member 30 is a single layer of tight wire screen such as sized to the diameter of the pins 20. It should be understood that other sieve-like materials will also benefit from the present invention. The flexible nature of the semi-rigid mold member 26 allows the composite skins 12, 14 (FIG. 4) to be consolidated down on the X-COR™ material and mechanically control the amount of compaction to the length of the pins in the core while accommodating minor variations in the core material dimensional tolerances.

One example of sieve member is Duch Weave Filter Coth, 50×250 with a 60 micron retention distributed by the Gerald Daniel and Company, Inc. of Hanover Pa. Such a screen provides effective retention of a 0.011 inch diameter pin. It should be understood that composite components formed with other types and or sizes of pins will require appropriately sized sieve members. Preferably, the sieve member is sized to receive a more narrow or sharpened end of the pin without permitting complete passage thereof.

Figure 2:
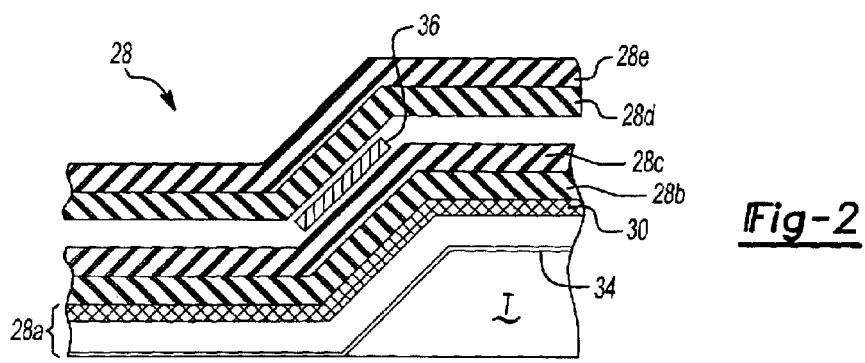
FIG. 2 is an exploded partial cross-sectional view of a semi-rigid mold member.

Referring to FIG. 2, the semi-rigid mold member 28 is preferably fabricated from a combination of reinforced tooling material, i.e., elastomer-impregnated fiber reinforcement material that is encapsulated in elastomeric material, unreinforced elastomeric material, and rigid reinforcement inserts 36 over a tool T. Tool T defines a 1-to-1 scale model of the outer contours of the finished composite article during the fabrication of the semi-rigid mold member 26 using conventional molding techniques. The plies of reinforced tooling material and unreinforced elastomeric material, and the rigid reinforcement inserts 36 are then layed-up on the tool T. The number of layers of reinforced tooling material and unreinforced elastomeric material required to form the semi-rigid mold member 28 depends upon the particular application. For further details regarding the fabrication of a semi-rigid mold member, reference is directed to U.S. Pat. No. 5,071,338, entitled "Tooling for Forming Complex Composite Articles", which is owned by the assignee of the present invention, and which is incorporated herein by reference.

Beginning adjacent the tool T, a first ply 28a of the semi-rigid mold member 28 includes an etched fluorinated ethylene propylene (FEP) film which forms the inner surface 34 (also illustrated in FIG. 1), a Fluoroelastomeric sheet rubber, and the sieve member 30. As will be further described below the sieve member may be located upon the Fluoroelastomeric sheet rubber or embedded therein at a predetermined depth.

A second ply 28b, provides an unreinforced Fluoroelastomeric sheet rubber. Fluoroelastomers such as FLUOREL® (3M Company, St. Paul, Minn.), a fully-saturated fluorinated polymer containing more than 60% fluorine by weight, or VITON® (E. I. du Pont de Nemours Corp., Wilmington, Del.), a series of fluoroelastomers based on a copolymer of vinylidene fluoride and hexafluoropropylene, are the preferred elastomeric materials due to their inertness, usability at high temperatures, and hardness range of about 70 to about 80 durometers. Other elastomers possessing similar characteristics such as halogenated elastomers, fluorosilicone elastomers, or fluorophoazene elastomers may additionally or alternatively be used.

A third ply 28c provides a reinforced Fluoroelastomeric sheet rubber. Aramid fibers or fabric such as KEVLAR® is the preferred fiber reinforcement material due to its high tear strength, tensile strength and modulus of elasticity. Other fiber reinforcement material such as graphite or glass fibers may also be used. The fiber reinforcement material utilized should provide stiffness and rigidity in detail areas while concomitantly providing uniform compaction of the fiber reinforcement layup.

Rigid reinforcement inserts 36 for the semi-rigid mold member 28 are preferably interleaved between the third ply 28c and the fourth ply 28d so as to be disposed in an opposed, parallel plane relationship with the corresponding ramped surfaces of the composite article. The inserts 36 provide additional symmetric pressure distributions across the ramped surfaces. The rigid reinforcement inserts 36 are formed from a structurally rigid material that retains such rigidity at the co-cure temperature utilized in the high temperature co-cure molding process. Preferably, the rigid reinforcement inserts 36 are formed from 6061T6 aluminum having a thickness of about 0.05 inches to have a planar configuration that matches the corresponding configurations of the ramped surfaces of the article being fabricated.

The fourth ply 28d provides a reinforced Fluoroelastomeric sheet rubber identical to the third ply 28c. Finally, a fifth ply 28e of an unreinforced Fluoroelastomeric sheet rubber identical to the second ply 28b finishes the semi-rigid mold member 28. The reinforced and unreinforced plys are then cured by conventional techniques to fabricate the semi-rigid mold member 28. It should be understood that other plys and number thereof will also benefit from the present invention.

Figure 3:
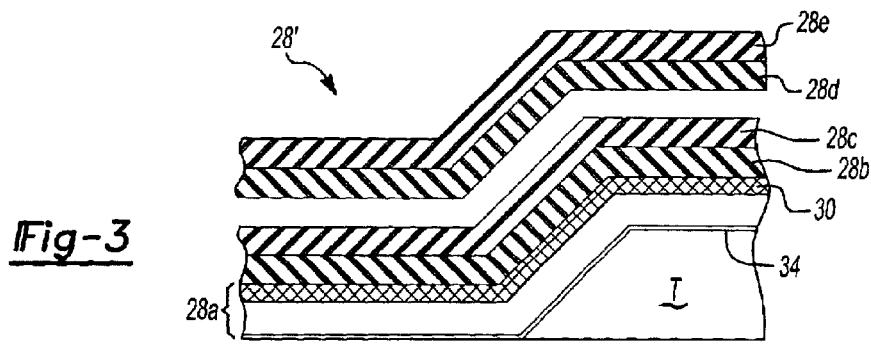
FIG. 3 is an exploded partial cross-sectional view of another semi-rigid mold member.

Referring to FIG. 3, another embodiment, of a semi-rigid mold member 28' is formed identically with that of FIG. 3, but without the inserts 36. As the pins 20 provide a bond/mechanical lock with the skins 14, 16 in the ramped surface of the core 18, the inserts 36 may be redundant at lower co-cure pressures. Elimination of the inserts simplifies fabrication of the tool and eliminates redundant material.

Referring to FIG. 4, the core material 18 is located between the uncured composite skins 14, 16 in the composite molding apparatus 10. That, as the composite skin 14 as layed up on the rigid base member 26, the core material 18 as located on the composite skin 14 and the composite skin 16 as layed up on the core material 18. The complementary semi-rigid mold member 28 is then secured to the rigid base member 26 by a securing clamp CL or the like.

The layed-up composite molding apparatus 10 is then sealed in a vacuum bag (illustrated schematically at VB). The vacuum bag VB is operative to encapsulate the composite molding apparatus 10 for insertion into an autoclave (not illustrated) wherein a conventional pressure temperature cycle is implemented. The vacuum bag VB may be formed from an elastic material such as nylon or an elastomeric material such as silicone, neoprene, or nitrile rubbers, the selected material being non-permeable to the pressure inducing medium of the autoclave. The vacuum bag VB includes a vacuum port VP that provides a fluidic interconnection to a vacuum source VS.

As the vacuum source VS is actuated to draw a vacuum inside the vacuum bag VB, the semi-rigid mold member 28 is drawn toward the rigid base member 26 to consolidate the composite skins 14, 16 to the core material 18 within cavity C and form the final shape of the composite article 12 (FIG. 4A). As the semi-rigid mold member 28 is drawn toward the rigid base member 26, the pins 20 begin to penetrate through the composite skins 14, 16. The pins 20 are eventually mechanically restrained by the rigid base member 26 while continuing to penetrate into the first layer 28A. Pin 20 penetration of the first layer 28a continues until the pins 20 reach the sieve member 30. The sieve member 30 engages the pins 20 within the first layer to mechanically control the amount of compaction of the composite skins 14, 16 and the core 18. That is, the pins 20 are trapped between the sieve member 30 and the rigid base member 26 to prevent deep penetration of the pins 20 into the first layer 28A and the eventual crushing of the carrier 22. The flexibility of the semi-rigid mold member 28, however, accommodates minor variations in the core material dimensional tolerances.

Referring to FIG. 5A, another embodiment of a first ply 28AA is illustrated. The first layer 28AA includes a release film such as an etched fluorinated ethylene propylene (FEP) film which forms the inner surface 34 (also illustrated in FIG. 1) of the semi-rigid mold member 28. The FEP film is applied to one surface of the fluoroelastomeric sheet and the sieve member 30 is applied dry to the opposite surface. The sieve member 30 will thereby be sandwiched between the first ply 28AA and the second ply 28B (FIG. 2) but the sieve member 30 is not pressed into the first ply 28A. In other words, the sieve member is between the first and second ply of the semi-rigid mold member 28 and the total height h of the fluoroelastomeric sheet and the FEP of ply 28AA film does not include the sieve member 30. Laying up additional plys with or without inserts as described above then completes the semi-rigid mold member 28. This embodiment does not substantially embed the sieve member into the first ply 28AA and positions the sieve member 30 further away from the inner surface 34 to accommodate pin reveal lengths that are longer.

Referring to FIG. 5B, another embodiment of a first ply 28Ab is illustrated. This embodiment is initially identical to the FIG. 5A embodiment. The FIG. 5B embodiment, however, includes independently autoclave pressing the first ply 28Ab such that the sieve member 30 is pressed deeper into the fluoroelastomeric sheet to a predetermined depth (FIG. 5B). That is the total height h of the fluoroelastomeric sheet and the FEP film includes at least some of the sieve member 30 height. In one exemplary embodiment, the sieve member 30 is 0.012 inches thick, the fluoroelastomeric sheet is 0.018 inches thick, and the FEP is 0.001 inches thick prior to autoclave pressing. In another exemplary embodiment, the fluoroelastomeric sheet is 0.032 inches thick. Laying up additional plys with or without inserts as described above completes the semi-rigid mold member 28. This embedded sieve member method positions the sieve member 30 closer to the inner surface 34 to accommodate shorter pin reveal lengths.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A semi-rigid mold member, comprising:
    a first ply, comprising an elastomeric sheet rubber and a release film;
    a second ply adjacent said first ply; and
    a sieve member adjacent said first ply and said second ply, said sieve member adjacent said elastomeric sheet rubber opposite said release film.

2. The semi-rigid mold member as recited in claim 1, wherein said sieve member is embedded in said first ply.

3. The semi-rigid mold member as recited in claim 1, wherein said first ply and said second ply include a fluoroelastomer material.

4. The semi-rigid mold member as recited in claim 1, wherein said sieve member includes a stainless steel screen.

5. The semi-rigid mold member as recited in claim 4, wherein said screen provides approximately 60 micron retention.

6. The semi-rigid mold member as recited in claim 1, wherein said release film comprises an FEP layer adjacent said first ply and opposite said second ply.

7. The semi-rigid mold member as recited in claim 6, further comprising a third ply adjacent said second ply, and a fourth ply adjacent said third ply.

8. The semi-rigid mold member as recited in claim 7, further comprising a rigid reinforcement insert between said third ply and said fourth ply.

9. The semi-rigid mold member as recited in claim 8, wherein said reinforcement insert includes a metallic sheet.

10. The semi-rigid mold member as recited in claim 7, wherein said third ply and said fourth ply include a fiber reinforced fluoroelastomer material.

11. A composite molding apparatus, comprising:
    a rigid mold member; and
    a semi-rigid mold member matable with said rigid mold member, said semi rigid mold member comprising a first ply located directly opposite said rigid mold member, said first ply compromising a sieve member, an elastomeric sheet rubber, and a release film, said release film and said sieve member located a adjacent said elastomeric sheet rubber, said release film facing said rigid mold member.

12. The composite molding apparatus as recited in claim 11, wherein said semi-rigid mold member comprises a second ply, said sieve member adjacent said first ply and said second ply.

13. The composite molding apparatus as recited in claim 12, wherein said second ply comprises a fluoroelastomer material.

14. The composite molding apparatus as recited in claim 12, further comprising a third ply adjacent said second ply, and a fourth ply adjacent said third ply.

15. The composite molding apparatus as recited in claim 14, further comprising a rigid reinforcement insert between said third ply and said fourth ply.

16. The composite molding apparatus as recited in claim 15, wherein said rigid reinforcement insert includes a metallic plate.

17. The composite molding apparatus as recited in claim 14, wherein said third ply and said fourth ply include a fiber reinforced fluoroelastomer material.

18. A semi-rigid mold member, comprising:
    a first ply;
    a second ply adjacent said first ply; and
    a sieve member adjacent said first ply and said second ply, said sieve member embedded in said first ply.

19. The composite molding apparatus as recited in claim 11, wherein said sieve member is embedded in said first ply.

20. The semi-rigid mold member as recited in claim 1, wherein said elastomeric sheet rubber material comprises an unreinforced Fluoroelastomeric sheet rubber.

21. The semi-rigid mold member as recited in claim 1, wherein said second ply comprises an unreinforced Fluoroelastomeric sheet rubber.

22. The composite molding apparatus as recited in claim 11, herein said elastomeric sheet rubber material comprises an unreinforced Fluoroelastomeric sheet rubber.

23. The semi-rigid mold member as recited in claim 1, wherein said first ply locates said sieve member a predetermined distance from said release film, said predetermined distance related to a plurality of protruding pins within a core located between a first composite prepreg and a second composite prepreg.

24. The composite molding apparatus as recited in claim 11, wherein said first ply locates said sieve member a predetermined distance from said release film, said predetermined distance related to a plurality of protruding pins within a core located between a first composite prepreg and a second composite prepreg formed within a cavity defined by said rigid mold member and said semi-rigid mold member.

25. The composite molding apparatus as recited in claim 11, wherein said sieve member provides approximately 60 micron retention.

\* \* \* \* \*